United States Patent [19]

Matsumoto

[11] Patent Number: 4,817,885
[45] Date of Patent: Apr. 4, 1989

[54] AUTOMATIC-EMERGENCY LOCKING RETRACTOR FOR SEAT BELTS

[75] Inventor: Kenjiro Matsumoto, Osaka, Japan

[73] Assignee: Ashimori Kogyo Kabushiki Kaisha, Osaka, Japan

[21] Appl. No.: 143,852
[22] PCT Filed: Apr. 24, 1987
[86] PCT No.: PCT/JP87/00263
 § 371 Date: Dec. 21, 1987
 § 102(e) Date: Dec. 21, 1987
[87] PCT Pub. No.: WO87/06544
 PCT Pub. Date: Nov. 5, 1987

[30] Foreign Application Priority Data
 Apr. 24, 1986 [JP] Japan ................... 61-60945

[51] Int. Cl.⁴ ............................................. B60R 22/40
[52] U.S. Cl. ........................ 242/107.4 A; 242/107.4 R
[58] Field of Search ............... 242/107.4 A, 107.4 R, 242/107.4 B, 107.4 D; 280/806; 297/478

[56] References Cited
U.S. PATENT DOCUMENTS

| 4,436,255 | 3/1984 | Matsui et al. | 242/107.4 A |
|---|---|---|---|
| 4,555,075 | 11/1985 | Schmidt et al. | 242/107.4 A |
| 4,566,649 | 1/1986 | Peterson | 242/107.4 A |
| 4,573,646 | 3/1986 | Willey | 242/107.4 A |
| 4,583,701 | 4/1986 | Matsui et al. | 242/107.4 A |
| 4,597,546 | 7/1986 | Yamamoto et al. | 242/107.4 A |
| 4,726,539 | 2/1988 | Schmidt et al. | 242/107.4 A |
| 4,729,524 | 3/1988 | Befort et al. | 242/107.4 A X |
| 4,747,562 | 5/1988 | Tsukamoto | 242/107.4 A X |
| 4,749,143 | 6/1988 | Tsukamoto et al. | 242/107.4 A |
| 4,767,082 | 8/1988 | Schmidt et al. | 242/107.4 A |

FOREIGN PATENT DOCUMENTS
60-99743  6/1985  Japan .

Primary Examiner—John M. Jillions
Attorney, Agent, or Firm—Birch, Stewart, Kolasch & Birch

[57] ABSTRACT

An automatic-emergency locking retractor for seat belts which comprises, a retractor comprised fundamentally of a spindle, a locking plate fitted to or mounted on the end of the rotating spindle, a locking ring fixedly secured to a retractor body, locking rollers movable along cam faces on this locking ring and engageable with the locking plate, a clutch plate for moving the rollers, a synchrogear arranged to be rotated synchronously with the spindle, and a hook mounted on said clutch plate and engageable with the synchrogear, and an acceleration sensor adapted to engage the hook with the synchrogear in an emergency situation of the vehicle; a lever engageable with said synchrogear; a stopper capable of preventing the engagement of the lever with the synchrogear; and a control cam which can be reversely rotated at a reduced speed relative to the rotation of the spindle, the control cam being engageable with the lever. This automatic-emergency locking retractor for seat belts comprises a mechanism wherein it may normally be operated as ELR, but in case the whole webbing is unwound upon fastening the seat occupant by the seat belt, its function can be changed of course from ELR to ALR, and also even in case the webbing is partially unwound its function can be changed from ELR to ALR provided that the acceleration sensor means is once actuated.

2 Claims, 6 Drawing Sheets

AUTOMATIC-EMERGENCY LOCKING RETRACTOR FOR SEAT BELTS

TECHNICAL FIELD

This invention relates to an improved automatic-emergency locking retractor for seat belts which is provided in a vehicle to restrain a seat occupant in case of emergency. More particularly, this invention relates to a highly reliable automatic-emergency locking retractor for seat belts which enables the seat occupant to feel comfortable when he is wearing the seat belt and which is operable without fail and has a special lever member mounted on a clutch plate for locking, and a control cam mechanism for controlling the lever member.

BACKGROUND ART

In recent years, a variety of traffic accidents are increasing with the increase in the number of road transport vehicles, and it is necessary to protect vehicle drivers and fellow passengers from these accidents. Therefore, at present, in many countries, vehicle's seat occupants are obligated to wear seat belts in order to prevent them from getting hurt or being physiologically injured. In general, a seat belt comprises a webbing for restraining a seat occupant, a buckle for wearing this webbing, and a retractor for controlling the unwinding and winding of the webbing. A variety of contrivances are exercised on the retractors for controlling the unwinding and winding of the webbing. As for such retractors for seat belts, there are Automatic Locking Retractors (ALR) wherein when the unwound webbing is once rewound operationally it cannot be pulled out any longer, and Emergency Locking Retractors (ELR) wherein arrangement is made such that when the acceleration exerted on the vehicle body is detected and it has increased to a predetermined value, the webbing cannot be pulled out any longer. A good many kinds of such retractors are already put on the market. Further, child restraining devices for child passengers have already been marketed. These child restraining devices are used by securing each of them onto a common seat by means of a seat belt. In this case, it is necessary from the viewpoint of safety to fixedly secure the child restraining device to a common seat prior to putting it to use. In such a case, the purpose of fixing the child restraining device securely onto the seat can readily be achieved by using a seat belt having an ALR function wherein when the webbing is once rewound it cannot be pulled out any longer. In contrast thereto, in case the child restraining device is fixedly secured onto a seat in the vehicle by means of a seat belt having ELR function, the vibration of the vehicle when it is running causes a relative motion between the child restraining device and the seat to which it is attached, and as a result, the seat belt tends to be unwound gradually from the retractor and get loose thus causing a condition in which the child restraining device is not fixedly secured by the seat belt. Therefore, to avoid such a risk, in case of fixedly securing the child restraining device to a seat by a seat belt having ELR function, it becomes necessary to carry out operations such as fixing the child restraining device to the seat securely in the condition the whole webbing is pulled out from the retractor and winding the remaining part of the webbing round a locking clip, thus requiring a very troublesome operation to attach the child restraining device to a common seat. For such reasons, in case of fixedly securing the child restraining device to a seat in the vehicle, it is convenient and recommendable from the viewpoint of safety to use a seat belt of ALR type.

However, the seat belts of ALR type are arranged when the webbing is once rewound, it cannot be pulled out any longer, and so in case there is no need of securing the child restraining device in the vehicle; that is to say, in case adult passengers occupy the seats in the vehicle, the use of seat belt of this type restrains the seat occupant always to his seat so as not to allow him to move his body freely thus letting him to feel uncomfortable when he is wearing the seat belt during the running of the vehicle.

In view of such situations, there has been developed in recent years a retractor for seat belts which can fulfill both ALR and ELR functions and which can be used selectively to fulfill either ALR or ELR function in such a manner that when the whole webbing is pulled out from the retractor it may function as ALR type seat belt, whilst in other conditions it may function as ELR type seat belt. For example, reference is to be made to U.S. Pat. Nos. 4,436,255, 4,583,701 and 4,597,546. 4,436,255 discloses a retractor for seat belts which comprises, in combination, a retractor comprised fundamentally of a ratchet wheel fixed on a webbing take-up shaft and a pawl engageable with the ratchet wheel so as to stop the unwinding rotation of the webbing from the take-up shaft; an inertia lock mechanism; and cam means which is comprised of a cam member and a follower member, the arrangement being made such that when the whole webbing is pulled out to restrain the occupant the pawl is engageable with the ratchet wheel, and when the webbing is unwound by a predetermined amount from the take-up shaft, the take-up shaft is rotatable freely in either direction, but when the inertia lock mechanism is actuated in a vehicular emergency situation the rotation of the take-up shaft is stopped. U.S. Pat. No. 4,583,701 discloses a retractor for seat belts which comprises an emergency locking retractor for a seat belt provided with an acceleration sensor; and a special cam ring, the arrangement being made such that when the whole webbing is unwound from the take-up shaft an automatic locking means is actuated. Further, U.S. Pat. No. 4,597,546 discloses a retractor for seat belts which comprises an emergency locking retractor for a seat belt provided with an acceleration sensor; a take-up shaft for winding a webbing thereon; a locking wheel connected with the take-up shaft so as to be rotated at a reduced speed relative thereto; and a special control means, and which is arranged such that when the whole webbing is unwound it may also function as an automatic locking retractor.

These automatic-emergency locking retractors comprise, in combination, a retractor which is operable fundamentally as an emergency locking retractor, and a special mechanism and which is arranged such that it may also function as an automatic locking retractor under a certain condition. However, the retractors having both ELR and ALR functions cannot operate as ALR unless the whole webbing is unwound, and in case the seat occupant does not know that the conversion of function from ELR to ALR takes place only when the whole webbing is unwound, he wears the seat belt by pulling out the webbing by a proper amount, and as a result, the retractor can be used only as ELR. In particular, in case the retractor of this type is used to fix a child restraining device onto a common seat by such a method, it can be used only as an emergency locking retractor, and therefore, there has been a problem of safety in that the webbing tends to get loose when the vehicle is running.

Thus, the prior art automatic-emergency locking retractors for seat belts can function only as ELR depending on the method of use. Therefore, it has been demanded to develop a new automatic-emergency locking retractor which can overcome such disadvantages and can always fulfill both the ELR and ALR functions.

OBJECT OF THE INVENTION

It is an object of the present invention to provide an automatic-emergency locking retractor for seat belts which can overcome the above-mentioned points at issue in the prior art automatic-emergency locking retractors for seat belts and which is arranged such that, not only when the whole webbing is pulled out by the seat occupant, but also even when the webbing is partially pulled out, its function may be changed automatically from ELR over to ALR provided that its locking mechanism is rendered operative.

Another object of the present invention is to provide an automatic-emergency locking retractor for seat belts wherein the seat occupant can feel comfortable when he is wearing the seat belt during running of the vehicle and its locking function may be fulfilled without fail in an emergency situation of the vehicle.

A further object of the present invention is to provide an automatic-emergency locking retractor for seat belts wherein a child restraining device can also be fixedly secured to a vehicular seat safely and fast.

Other objects, features and advantages of the automatic-emergency locking retractor of the present invention will become apparent from the following description.

DISCLOSURE OF THE INVENTION

According to the present invention, there is provided an automatic-emergency locking retractor for seat belts as mentioned below, namely, an automatic-emergency locking retractor for seat belts which comprises a spindle for winding a webbing, said spindle being rotatably supported on a retractor body and adapted to be given a turning force in the direction of winding of the webbing; a synchrogear and a locking plate having external gear teeth formed on the outer periphery thereof, said synchrogear and said locking plate, respectively, being mounted on this spindle so as to rotate synchronously therewith; a locking ring fixedly secured to said retractor body and having circumferentially inclined cam faces formed therein; locking rollers movable along the cam faces of this locking ring and engageable with the external gear teeth on said locking plate; a clutch plate rotatably mounted relative to said spindle and biased in the direction of winding of the webbing so as to move said locking rollers; and a hook supported on this clutch plate so as to turn freely and engageable with said synchrogear by the action of the acceleration exerted on the vehicle body, characterized in that said retractor has a lever supported on the clutch plate so as to turn freely and engageable with said synchrogear; a spring member for biasing this lever in the direction of its engagement with said synchrogear; a stopper provided on a fixing member so as to project therefrom and adapted to prevent the engagement of said lever with the synchrogear when said clutch plate is under no load condition; and a control cam, this control cam being arranged such that it may be reversely rotated at a reduced speed relative to the rotation of said spindle, the arrangement being made such that when the whole webbing is unwound said control is engageable with said hook and operable to engage this hook with the synchrogear, whilst when the webbing is wound by a predetermined amount said control cam is engaged with said lever and operable to disengage this lever from the synchrogear.

The automatic-emergency locking retractor for seat belts according to the present invention has a variety of characteristic features over the conventional retractors of the same kind. One of the features resides in the provision of a mechanism for driving a control cam which is reversely rotatable at a reduced speed relative to the rotation of the spindle. This mechanism comprises (a) an eccentric shaft portion formed on the end of the spindle towards the synchrogear eccentrically relative to the central axis of rotation of the spindle, and a concentric shaft portion formed concentrically with said central axis; (b) a circular external gear mounted on said eccentric shaft portion and having three pins projecting therefrom and spaced apart at an angle of 120 degrees along the circumference of a circle of the same radius; (c) an internal gear mounted inside a frame member fixedly secured to the retractor body, said internal gear having a diameter larger than that of said external gear and meshing with the same; and (d) a control cam rotatably mounted on said concentric shaft portion and having three through holes formed therein and in which the three pins projecting from said external gear are fitted. Another feature resides in the provision of a lever having a special construction which is engageable with the synchrogear supported on the clutch plate, the lever being operable together with the control cam to change the function of the retractor from ELR to ALR.

The present invention will now be described briefly with reference to the accompanying drawings.

FIG. 3-1 is a sectional view of the portion including a base plate and the main parts of the spindle when the retractor shown in FIG. 2 is taken perpendicularly along line A—A';

FIG. 3-2 is a sectional view of the portion including the base plate and the main parts of the spindle when the retractor shown in FIG. 2 is taken perpendicularly along line B—B';

Figure 1:
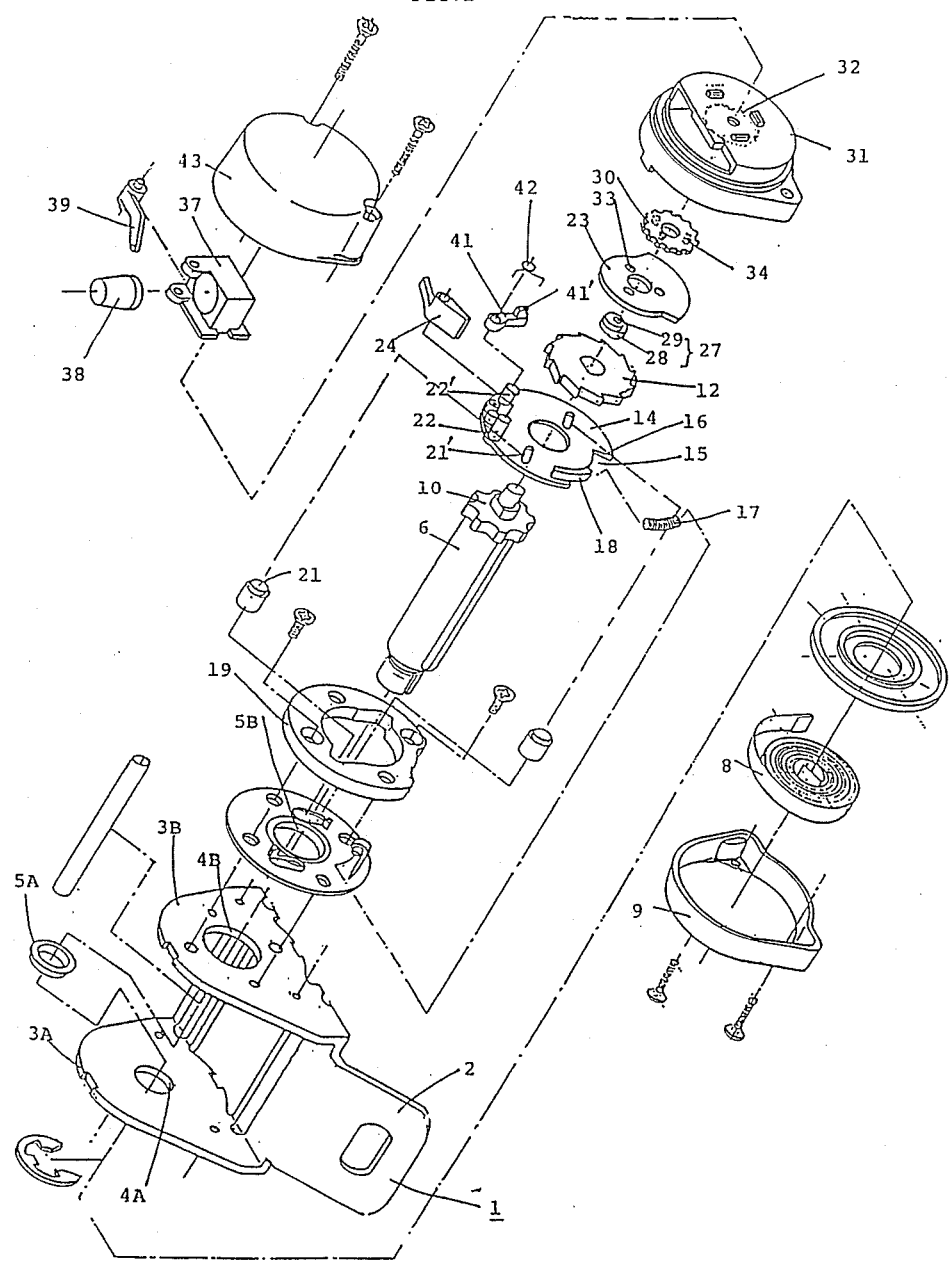
FIG. 1 is an exploded perspective view showing one embodiment of the automatic-emergency locking retractor for seat belts illustrating the mechanism in which the characteristic features of the present invention are incorporated.

FIGS. 4(A) and 4(B) are a front view and a vertical sectional view, respectively, of the control cam;

FIGS. 5(A) and 5(B) are a front view and a vertical sectional view, respectively, of the external gear; and FIGS. 6(A), 6(B), 6(C) and 6(D) are explanatory views showing operational conditions of the automatic-emergency locking retractor for seat belts shown in FIG. 1.

The present invention will now be described below in more detail with reference to the accompanying drawings. Throughout the drawings the same reference numerals denote identical parts.

Figure 2:
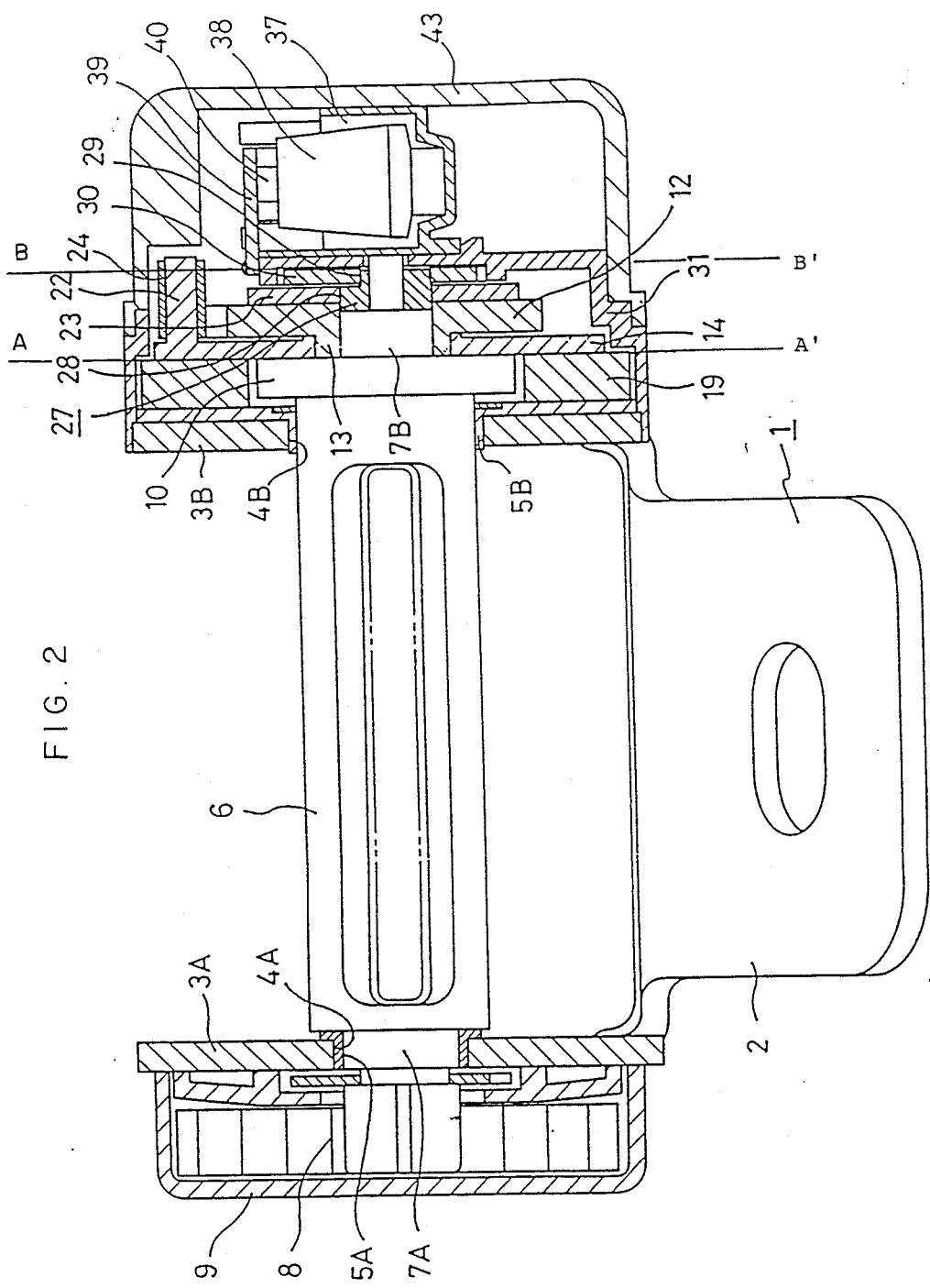
FIG. 2 is a vertical sectional view showing the automatic-emergency locking retractor for seat belts shown in FIG. 1.
Figures 1, 3:
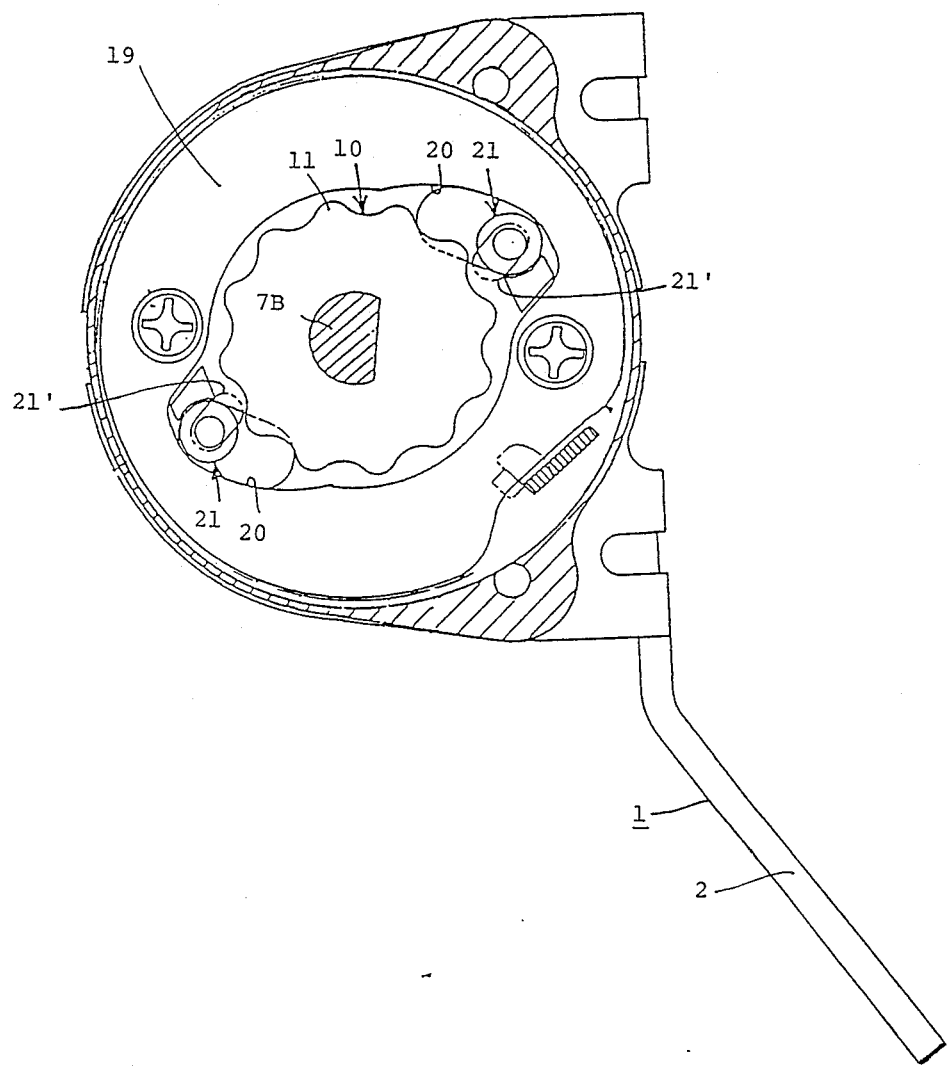
Figures 2, 3:
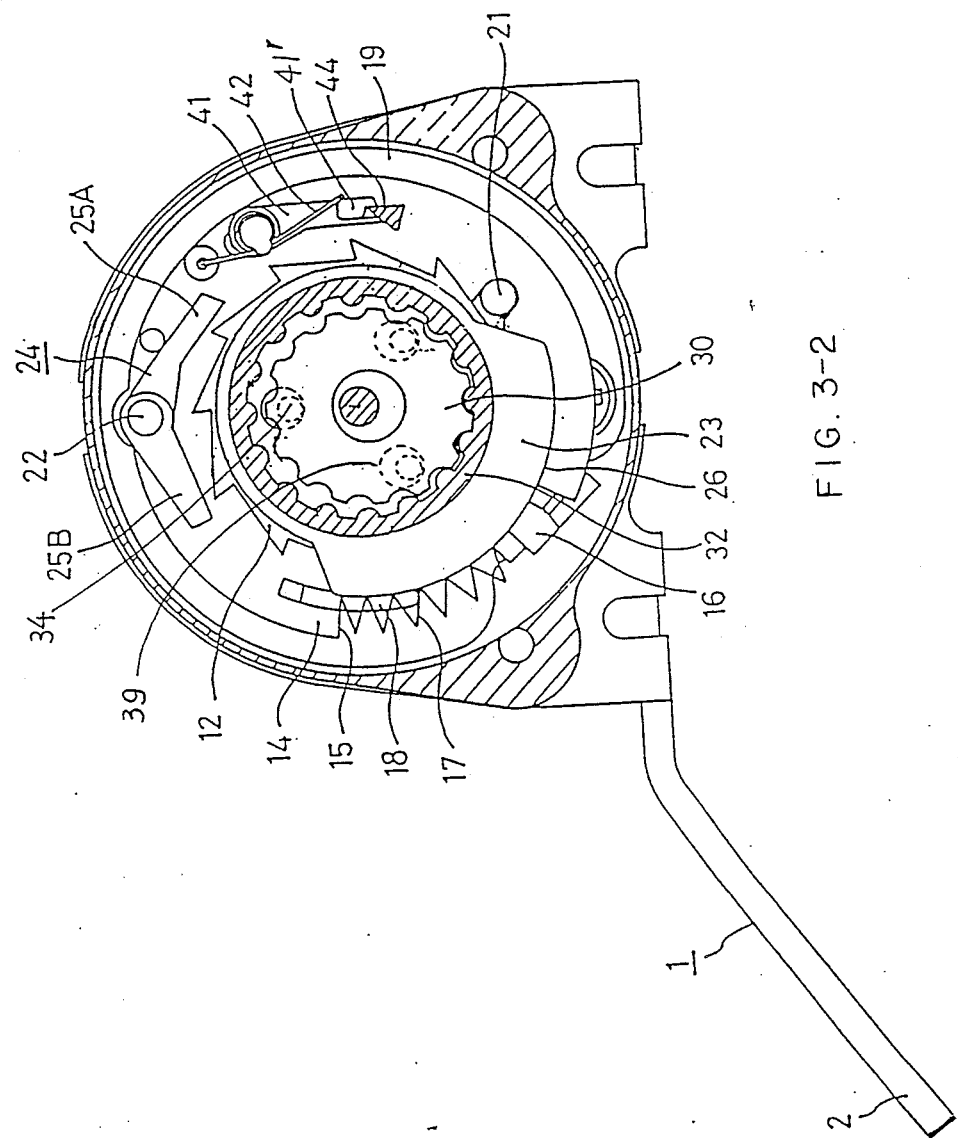

In one embodiment of the automatic-emergency locking retractor for seat belts according to the present invention shown in FIGS. 1, 2, 3-1, and 3-2, a retractor body 1 to be attached to a vehicle body is of an approximately U-shaped configuration formed by a base plate 2 fixedly secured to the vehicle body, and a pair of upstanding base plates 3A and 3B which are formed integrally or formed separately and fixedly secured together by screws on both side edges of the retractor body 1 in opposed and parallel relationship with each other. Both the side plates 3A and 3B have bearing receiving holes 4A and 4B, respectively, which are perforated coaxially in the central parts thereof. The bearing hole 4B formed in the side plate 3B has a diameter larger than that of the bearing hole 4A in the side plate 3A. Further, bearings 5A and 5B are fixedly mounted in bearing holes 4A and 4B, respectively. A spindle 6 for winding a webbing, not shown, is rotatably mounted on the bearings 5A and 5B. A small diameter portion 7A formed on one end of the spindle 6 so as to project therefrom is supported in the bearing 5A, whilst the other end of the spindle 6 is supported in the bearing 5B.

The small diameter portion 7A of the above-mentioned spindle 6 extends through the above-mentioned side plate 3A. Attached to this small diameter portion 7A is an inner end of a spiral spring 8, the outer end of which is attached to a cover 9 for covering the outside of the side plate 3A. This spiral spring 8 is arranged to transmit a turning force in the direction of winding of the webbing to the abovementioned spindle 6.

The end portion of the above-mentioned spindle 6 journalled in the bearing 5B extends through the side plate 3B. This end portion of the spindle 6 has a locking plate 10 mounted thereon and which has external teeth 11 formed on the outer periphery thereof. This locking plate 10 is arranged so as to be rotated synchronously together with the spindle 6. Further, a small diameter portion 7B of the above-mentioned spindle 6 projecting out from the above-mentioned locking plate 10 has a synchrogear 12 mounted on the outer periphery thereof. This synchrogear 12 is also arranged to be rotated synchronously with the spindle 6. This synchrogear 12 has a hub 13 formed integrally therewith and which is located on the outer periphery of the small diameter portion 7B. An annular clutch plate 14 is rotatably supported on this hub 13. This clutch plate 14 has a notch 15 formed in a part of the outer periphery thereof. Interposed between a fixed spring seat 16 extending inside this notch 15 and the end face of the notch 15 is a coiled spring 17 which is guided by a circular-arc shaped guide rod 18 extending from the clutch plate 14 into the notch 15. The clutch plate 14 is arranged to be given a turning force in the direction of winding of the webbing by this coiled spring 17.

The side plate 3B of the above-mentioned retractor body 1 has a locking ring 19 comprised of an annular plate mounted thereon adjacent to the above-mentioned clutch plate 14 and with a predetermined space interval or clearance kept from the outer periphery of the above-mentioned locking plate 10. This locking ring 19 has a plurality of circumferentially inclined cam faces 20 formed inside thereof. The abovementioned clutch plate 14 has radially extending guide holes 21' formed therein and the number of which corresponds to that of the cam faces 20. Inserted in each of the guide holes 21' is the axial base portion of a cylindrical locking roller 21 which extends in the clearance between the above-mentioned locking plate 10 and the locking ring 19. Each locking roller 21 is normally located at a position spaced apart from the outer periphery of the above-mentioned locking plate 10. When the clutch plate 14 is turned in the direction of unwinding of the webbing (counter-clockwise in FIGS. 3-1 and 3-2), the locking roller 21 is moved along the cam face 20 in the locking ring 19 closer to the outer periphery of the locking plate 10 until it is engaged with one of the external teeth 11 formed on the locking plate 10 thus restraining the rotation of the spindle 6.

The above-mentioned clutch plate 14 has pins 22 and 22' projecting therefrom and extending in parallel with the axis of the above-mentioned spindle 6. These pins 22 and 22' extend radially outwardly of the above-mentioned synchrogear 12 and also of a control cam 23 which will be mentioned later. The central portion of a generally angle-shaped hook 24 is pivotally mounted on the pin 22 in the manner such that it may be turned freely. This hook 24 has one arm 25A formed therewith and which is engageable with the abovementioned synchrogear 12, and another arm 25B which is engageable with a cam face 26 on the above-mentioned control cam 23 to thereby enable the hook 24 to be turned. Further, this hook 24 is constructed such that the arm 25B is heavier than the arm 25A to enable the arm 25B to assume normally its lowered position.

The end portion of the small diameter portion 7B of the above-mentioned spindle 6 has a rotor 27 mounted thereon and which is comprised of a concentric shaft portion 28 formed concentrically with the small diameter portion 7B and an eccentric shaft portion 29 formed eccentrically with the small diameter portion 7B, both shaft portions 28, 29 being formed integrally. Mounted on the eccentric shaft portion 29 of this rotor 27 is an external gear 30 which is disposed eccentrically relative to the small diameter portion 7B and which constitutes a planet gear. Whilst, the above-mentioned side plate 3B has a frame member 31 which projects from the outer periphery thereof and extends to the side of the external gear 30. This frame member 31 has an internal gear 32 which is mounted inside thereof and has a diameter larger than that of the external gear 30 arranged to be rotated eccentrically relative to the axis of rotation of the spindle 6 and which meshes with the external gear 30. The above-mentioned control cam 23 disposed between the above-mentioned synchrogear 12 and external gear 30 is loosely mounted on the coaxial shaft portion 28 of the rotor 27 so that it may be rotated freely relative to the coaxial shaft portion 28.

The above-mentioned frame member 31 has a rest 37 projecting upwardly therefrom. Resting on this rest 37 is a pendulum 38 serving as an acceleration sensor means which upstands normally and is overturned by the acceleration exerted on the vehicle body. Further, an oscillating arm 39 is pivotally mounted on the above-mentioned rest 37 in such a manner as to oscillate freely. The oscillating arm 39 has a projection 40 formed in the central part thereof so as to extend therefrom and adapted to be seated on the upper surface of the above-mentioned pendulum 38. And, the arrangement is made such that when the above-mentioned pendulum 38 is overturned the oscillating arm 39 is turned so as to raise its projection 40 and allowed to abut against the arm 25B of the above-mentioned hook 24 to thereby turn the hook 24 clockwise in FIG. 3-2. Further, the above-mentioned arm 25B is formed to have a larger width axially of the spindle 6. The above-mentioned cam face 26 and oscillating arm 39 are arranged to abut against the arm 25B at different positions axially of the spindle 6 without interfering with each other.

Figure 4:
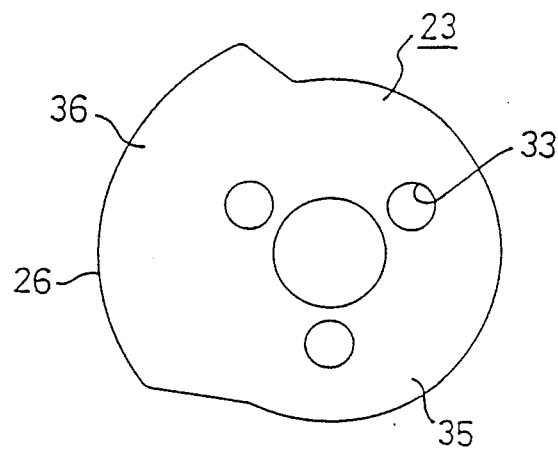
Figure 4:
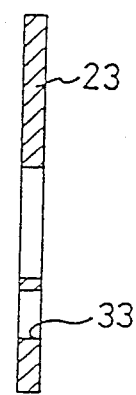

A lever 41 engageable with the above-mentioned synchrogear 12 is supported by the pin 22' of the above-mentioned clutch plate 14 in such a manner as it may be turned freely. This lever 41 is biased by a spring 42 in the direction of its engagement with the synchrogear 12; that is to say, clockwise in FIG. 3-2. The synchrogear 12 has a tooth profile selected so that it may be rotated only in the direction of winding of the webbing in the condition the above-mentioned lever 41 is engaged with the synchrogear 12. Further, this lever 41 has a projection 41' formed thereon in the direction of the thickness of the addendum of the synchrogear 12. In the condition almost all of the webbing is taken up or wound, the above-mentioned control cam 23 is allowed to abut against the projection 11' so as to locate the lever 41 at a position where it can be disengaged from the synchrogear 12. Further, the above-mentioned side plate 3B has a cover 43 fitted to the outermost part thereof to cover and protect the aforementioned acceleration sensor means etc. Furthermore, the frame member 31 has a stopper 44 projecting therefrom and which is engageable with the projection 41' of the lever 41 when the above-mentioned clutch plate 14 is located at its unlocked position. FIG. 4 shows the configuration of the control cam 23 in detail; FIG. 4(A) shows a front view thereof, and FIG. 4(B) a vertical sectional view thereof. As shown in FIG. 4(A), this control cam 23 is comprised of a disk 35 having a projection 36 formed thereon to project in an angular extent of approximately 100 degrees along the circular arc. The circular arc shaped outer peripheral surface of this projection 36 forms the above-mentioned cam surface 26. This disk 35 has three circular or square holes 33 formed therethrough along the circumference of a circle of the same radius and which are spaced apart at an angle of 120 degrees with one another.

Figure 5:
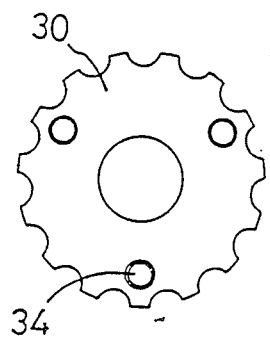
Figure 5:
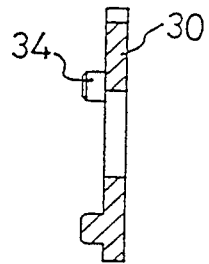

FIG. 5 shows the configuration of the external gear 30 in detail; FIG. 5(A) shows a front view thereof, and FIG. 5 (B) a vertical sectional view thereof. This external gear 30 has three pins 34 projecting from one side surface thereof at an angular spacing of 120 degrees with one another, each of the pins 34 being adapted to be inserted in each of the holes 33 of the above-mentioned control cam 23 so as to slidably contact with the inner peripheral surface of each hole 33. Thus, with the rotation of the above-mentioned spindle 6, there occurs a relative motion between the external gear 30 mounted on the above-mentioned eccentric shaft portion 29 and the internal gear 32 mounted on the above-mentioned frame member 31, this relative motion causes the above-mentioned control cam 23 to rotate at a reduced speed relative to that of the spindle 6 and reversely to the direction of rotation of the latter. Further, the above-mentioned control cam 23 is rotated by approximately 180 degrees relative to the amount of rotation of the spindle 6 from the condition in which the whole webbing is pulled out to the condition in which the whole webbing is unwound. Furthermore, immediately before the condition the whole webbing is unwound, one end of the cam face 26 of the control cam 23 abuts against the arm 25B of the hook 24 pivotally mounted on the pin 22 of the clutch plate 14, which is located at its lowered position, so as to turn the hook 24 clockwise in FIG. 3-2 to allow the arm 25A to enter into orbit of the teeth of the synchrogear 12.

The operation of this automatic-emergency locking retractor for seat belts will now be described below in detail with reference to FIGS. 6(A) to 6(D) inclusive.

Figure 6:
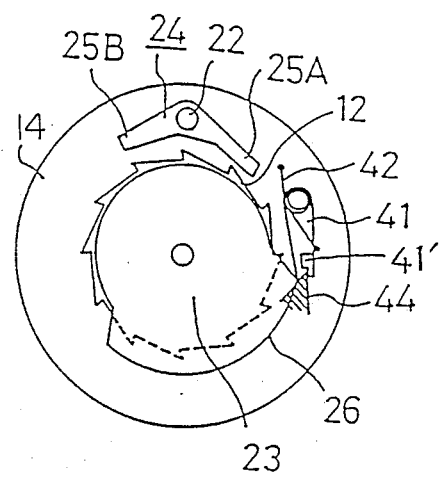
Figure 6:
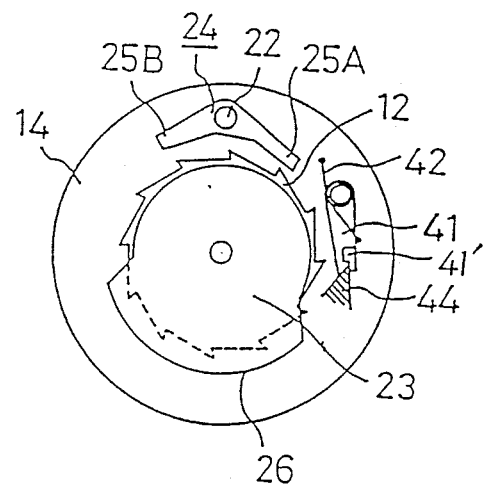
Figure 6:
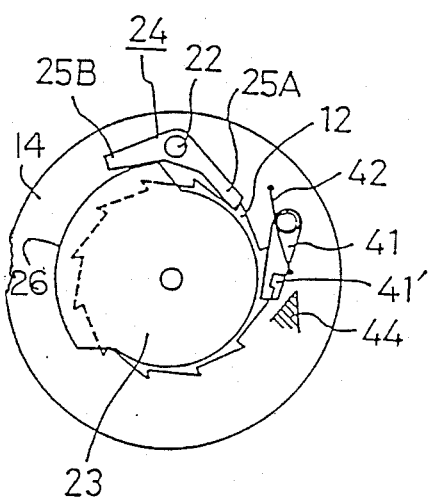
Figure 6:
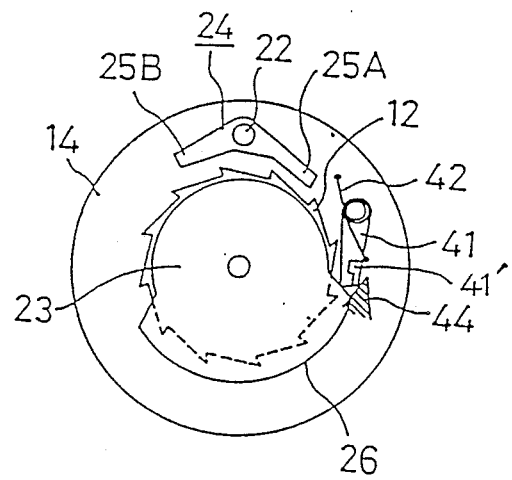

FIG. 6(A) shows the condition in which the whole webbing is taken up in the automatic-emergency locking retractor for seat belts shown in FIGS. 1 to 3. In this condition, the arm 25A of the hook 24 is located at a position where it is not engaged with the synchrogear 12, and the projection 41' of the lever 41 is engaged with the stopper 44 so as to prevent the lever 41 from engaging with the synchrogear 12.

Further, the end of the cam face 26 of the control cam 23 is located in the vicinity of the projection 41' of the lever 41 restrained by the stopper 44, and so even if the lever 41 is disengaged from the stopper 44, the lever 41 cannot be engaged with the synchrogear 12.

FIG. 6(B) shows the condition in which the webbing is unwound by a certain amount to permit the seat occupant to fasten his body. As the webbing is pulled out, the spindle 6 around which the webbing is wound is rotated against the resilient force of the spiral spring 8, which accompanies with the rotation of the synchrogear 12 together with the locking plate 10 and the rotor 27 in the counterclockwise direction in FIG. 5(A). Further, at that time, the control cam 23 is rotated clockwise at a reduced rotational speed. In such a condition, the retractor is rendered operative as ELR.

FIG. 6(C) shows the condition in which almost all of the webbing is pulled out or unwound. In this condition, the cam face 26 of the control cam 23 is caused to abut against the arm 25B of the hook 24 so as to turn the hook 24 clockwise. With the webbing being pulled out further in this condition, the arm 25A of the hook 24 is engaged with the synchrogear 12 and the hook 24 is pushed by the synchrogear 12, which is rotating counterclockwise, so as to turn the clutch plate 14 having the hook 24 attached thereto counterclockwise against the resilient force of the coiled spring 17. As a result, the projection 41' of the lever 41 is disengaged from the stopper 44, and the lever 41 is engaged with the synchrogear 12 by the action of the spring 42. The lever 41 permits the rotation of the synchrogear 12 in the direction of winding of the webbing, but restrains the rotation of it in the direction of unwinding of the webbing, and therefore in this condition the retractor is operative as ALR.

FIG. 6(D) shows the condition in which the seat belt is unfastened from the seat occupant. In this case, the webbing is wound round the take-up shaft by the rotation of the spindle. When almost all of the webbing has been rewound, the cam face 26 of the control cam 23 is allowed to abut against the projection 41' of the lever 41 so as to turn the lever 41 counterclockwise against the resilient force of the spring 42 to disengage the lever 41 from the synchrogear 12 to thereby enable the synchrogear 12 to be rotated also in the direction of unwinding of the webbing and enable the retractor to operate as ELR again. Further, the lever 41 which has been turned counterclockwise by the control cam 23 is restrained because the projection 41' is engaged with the stopper 44.

Unless the whole webbing is unwound, the retractor of the present invention is rendered operative as ELR. However, if in this condition the pendulum 38 is overtuned by the acceleration exerted on the vehicle body to thereby turn the oscillating arm 39 and allow the arm 25A of the hook 24 to turn the hook 24 so as to engage with the synchrogear 12, the clutch plate 14 is rotated together with the synchrogear 12 to disengage the projection 41' of the lever 41 from the stopper 44, in the same manner as in the aforementioned case in which the whole webbing is unwound, to thereby allow the lever 41 to engage with the synchrogear 12, and thereafter allow the retractor to be rendered operative as ALR. Further, when the acceleration is applied to the vehicle body, the movement of the clutch plate 14 is followed with a movement of the locking roller 21 along the cam face 20 of the locking ring 19 to cause engagement of the locking roller with one of the external teeth 11 of the locking plate 10 to thereby restrain the rotation of the spindle 6 and prevent also the unwinding of the webbing.

The retractor of the present invention can be actuated once as ELR and thereafter as ALR not only when the whole webbing is unwound to permit the seat occupant to fasten his body, but also in a condition all of the webbing is not unwound, so that either of the ALR and ELR functions can be fulfilled regardless of the amount of unwinding of the webbing. Accordingly, the seat occupant can feel extremely comfortable when he is wearing the seat belt, and even in case it is utilized in the operational mode of ELR to secure a child restraining device to a vehicle's seat, it can be operated as ALR after the acceleration is exerted on the vehicle body so that the child restraining device can be fixedly secured safely. Thus, the automatic-emergency locking retractor for seat belts according to the present invention is capable of operating with certainty and giving the seat occupant a comfortable feeling when he is wearing the seat belt and attaching a child restraining device extremely safely. Therefore, it can be said that the retractor of the present invention has succeeded in overcoming or eliminating all the disadvantages of the prior art retractors of the same sort. Accordingly, the automatic-emergency locking retractor for seat belts according to the present invention is particularly useful in the field of the industry of transport facilities including motor vehicles.

What we claim is:

1. An automatic-emergency locking retractor for seat belts, comprising a spindle for winding a webbing, said spindle being rotatably supported on a retractor body and adapted to be given a turning force in the direction of winding of the webbing; a synchrogear and a locking plate having external gear teeth formed on the outer periphery thereof, said synchrogear and said locking plate, respectively, being mounted on this spindle so as to rotate synchronously therewith; a locking ring fixedly secured to said retractor body and having circumferentially inclined cam faces formed therein; locking rollers movable along the cam faces of this locking ring and engageable with the external gear teeth on said locking plate; a clutch plate rotatably mounted relative to said spindle and biased in the direction of winding of the webbing so as to move said locking rollers; and a hook supported on this clutch plate so as to turn freely and engageable with said synchrogear by the action of the acceleration exerted on the vehicle body, characterized in that said retractor has a lever supported on the clutch plate so as to turn freely and engageable with said synchrogear; a spring member for biasing this lever in the direction of its engagement with said synchrogear; a stopper provided on a fixing member so as to project therefrom and adapted to prevent the engagement of said lever with the synchrogear when said clutch plate is under no load condition; and a control cam, said control cam being arranged such that it may be reversely rotated at a reduced speed relative to the rotation of said spindle, the arrangement being made such that when the whole webbing is unwound said control cam is engaged with said hook and operable to engage this hook with the synchrogear, whilst when the webbing is wound by a predetermined amount said control cam is engaged with said lever and operable to disengage this lever from the synchrogear.

2. The automatic-emergency locking retractor for seat belts as set forth in claim 1, wherein said spindle has an eccentric shaft portion formed on the end thereof towards the synchrogear eccentrically relative to the central axis of rotation thereof, and a concentric shaft portion formed concentrically with said central axis, said eccentric shaft portion having a circular external gear mounted thereon, the external gear having three pins projecting therefrom and spaced apart at an angle of 120 degrees along the circumference of a circle of the same radius, said retractor body having an internal gear mounted inside a frame member fixedly secured thereto, the internal gear having a diameter larger than that of said external gear and meshing with the same, said control cam being rotatably mounted on said concentric shaft portion and having three holes which are formed therethrough and in which the three pins secured to said external gear are fitted, the arrangement being made such that the control cam can be reversely rotated at a reduced speed relative to the rotation of the spindle.

* * * * *